United States Patent [19]

Mueller

[11] Patent Number: 4,927,399
[45] Date of Patent: May 22, 1990

[54] DIAPHRAGM GAME CALL WITH TONE MODIFYING SLITS

[75] Inventor: Mark Mueller, Pacific, Mo.

[73] Assignee: Penn's Woods Products, Inc., Delmont, Pa.

[21] Appl. No.: 300,856

[22] Filed: Jan. 24, 1989

[51] Int. Cl.$^5$ ............................................. A63H 5/00
[52] U.S. Cl. .................................... 446/207; 446/203; 446/188
[58] Field of Search ............... 446/207, 208, 209, 202, 446/203, 204, 205, 206, 397, 404, 188

[56] References Cited

U.S. PATENT DOCUMENTS

| | | | |
|---|---|---|---|
| 978,943 | 12/1910 | Schwartz | 446/203 |
| 1,856,625 | 5/1932 | Dressler | 446/206 |
| 2,256,925 | 9/1941 | McCoy | 446/202 |
| 2,385,752 | 9/1945 | Wilson | 446/209 |
| 3,791,653 | 2/1974 | Yamada | 446/404 X |
| 4,151,678 | 5/1979 | Robertson | 446/209 |
| 4,341,037 | 7/1982 | Moss | 446/204 |
| 4,371,278 | 2/1983 | Joo | 446/207 X |
| 4,483,097 | 11/1984 | Piper | 446/207 |
| 4,764,145 | 8/1988 | Kirby | 446/208 |

FOREIGN PATENT DOCUMENTS 12423  5/1909  United Kingdom ............... 446/204

OTHER PUBLICATIONS

Penn's Woods Products catalog, "*Turkey Calls & Accessories*".

Primary Examiner—Robert A. Hafer
Assistant Examiner—D. Neal Muir
Attorney, Agent, or Firm—Dann, Dorfman, Herrell and Skillman

[57] ABSTRACT

The present invention provides a dual diaphragm-type game caller of a size and shape suitable for inserting into a user's mouth for support against the roof of the mouth so that free edges of two diaphragms retained together as a unit in a spaced-apart relationship can concurrently vibrate when impinged by pulmonary air exhausted by the user. The invention employs two diaphragms having a selected pattern of slits which allow the caller to produce a flutter or raspy sound effect which is sometimes desired by the wild turkey hunter.

20 Claims, 1 Drawing Sheet

DIAPHRAGM GAME CALL WITH TONE MODIFYING SLITS

FIELD OF THE INVENTION

The present invention relates to a game caller having a size and shape suitable for insertion into a user's mouth for support against the roof of the mouth so that free edges of two diaphragms retained together as a unit in a spaced-apart relationship can concurrently vibrate when impinged by pulmonary air exhausted by the user. More particularly, the present invention relates to a dual diaphragm-type game caller having diaphragmatic slits for enhancing desired calls.

BACKGROUND OF THE INVENTION

The game caller of the present invention is particularly suitable for use by sportsmen while hunting wild game, such as turkey. Conventionally, a game caller having a single diaphragm has been used. Such a caller is constructed of a diaphragm supported by a bendable frame, usually made of aluminium, held together by an outside casing or plastic sheet. The caller is used by fitting it against the roof of the user's mouth where exhausted pulmonary air vibrates the diaphragm. The sound producing capabilities of such a caller are limited. The single diaphragm caller cannot be used to produce the variety of complex sounds made by a wild turkey in its natural habitat. While the diaphragm can be tensioned and operated to produce certain types of single tone-like sounds which turkeys are known to make, it cannot be used to produce, for example, the double note whistle-like sound and raspy tones of a yelp.

A game caller having two diaphragms has also been used. Although such a caller is capable of producing a greater variety of complex sounds than the single diaphragm-type of caller, the conventional dual diaphragm devices is not always capable of producing desired tones, such as selected raspy tones made by the wild turkey.

SUMMARY OF THE INVENTION

In accordance with the present invention a game caller is provided which is capable of producing complex tones comprised of multiple frequencies to simulate a great variety of sounds made by wild game, particularly turkey. The game caller employs two diaphragms having a selected pattern of slits which allow the caller to produce a flutter or raspy sound effect which is sometimes desired by the hunter.

Generally, the present invention provides a game caller having a size and shape suitable for insertion into a user's mouth for support against the roof of the mouth for impingement with exhausted pulmonary air to simulate sounds normally made by wild game. The caller comprises a support, and first and second generally flat diaphragms held by the support. The diaphragms are fixedly retained by the support in a spaced-apart relationship with one diaphragm generally overlying the other. The pair of diaphragms have slightly different surface areas, but each diaphragm presents an edge free to vibrate in order to permit the generation of a desired call. The vibratory edges are positioned substantially parallel to each other, but one edge is slightly offset from the other. One diaphragm has at least two slits generally perpendicular to its vibratory edge to provide a vibratory flap in the diaphragm; the other diaphragm has at least one half generally parallel to its vibratory edge.

BRIEF DESCRIPTION OF THE DRAWINGS

The foregoing summary and the following detailed description of the invention will be better understood when read in conjunction with the accompanying drawings, in which.

DETAILED DESCRIPTION OF THE INVENTION

Figure 1:
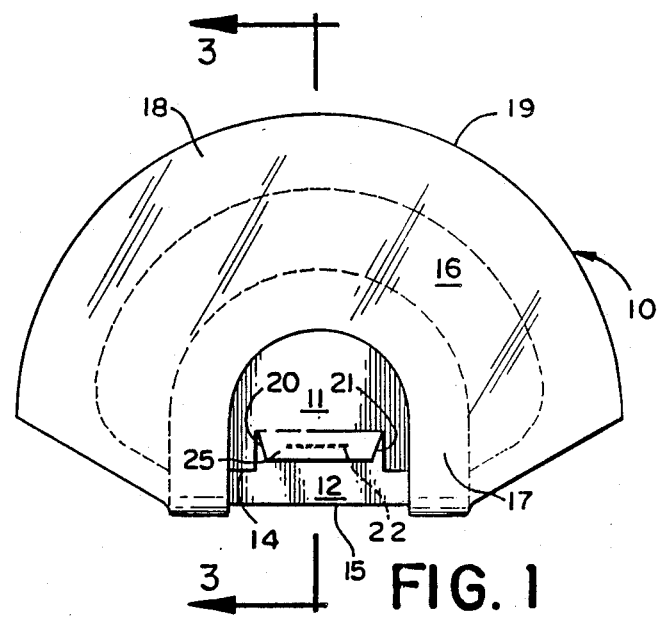
FIG. 1 is a plan view of the game caller.

Referring to the FIGS., the present invention provides a game caller, generally designated 10, having a size and shape suitable for support against the roof of a user's mouth for impingement with exhausted pulmonary air to simulate sounds normally made by wild game. The caller comprises a support structure for first and second generally flat, latex sheet-like diaphragms 11 and 12. The diaphragms are fixedly retained by the support structure in a generally parallel spaced-apart relationship with one diaphragm 11 generally overlying the other diaphragm 12 on the support structure. Each diaphragm has a different surface area exposed from the support structure and each diaphragm presents an edge free of the support structure to vibrate from the exhausted pulmonary air. The respective vibratory edges 14 and 15 are disposed in a generally parallel relationship to each other, but with one edge 14 being generally offset from the generally parallel edge 15 of the other diaphragm in a direction normal to the parallel edges along a reference plane generally parallel to the diaphragms, as best shown in FIG. 1. The first diaphragm 11 has at least two slits 20 and 21 generally perpendicular to its vibratory edge 14 to provide a flap 25 on the diaphragm 11. The second diaphragm 12 has at least one slit 22 generally parallel to its vibratory edge 15.

The support structure of the game caller comprises a spacer 16, a frame 17, and a fastener 18. The frame 17 is initially generally elliptical in shape with a centrally-disposed window. During assembly, the frame is bent in half to form first and second generally C-shaped frame half portions. The frame 17 is bent in half so that the C-shaped half portions of the frame generally align with each other.

The spacer 16 is generally C-shaped so that it may be positioned between at least portions of the two diaphragms and then aligned and held in position between the bent C-shaped frame halves. As such, one diaphragm is supported between the spacer and the first frame half and the other diaphragm is supported between the spacer and the second frame half. The frame 17 is bent in half and compressed to hold the spacer and the diaphragms in position. The spacer, the frame, and the diaphragms are in turn held together in a fixed of a generally pliable sheet-like casing.

The first and second diaphragm 11 and 12 are both made of latex or other suitable material. The diaphragms 11 and 12 preferably have generally straight vibratory edges 14 and 15, respectively. The diaphragms are placed against opposite sides of the approximately C-shaped spacer 16 which is made of paper or other suitable material so that the diaphragms may be held by the frame 17 in the generally spaced-apart relationship by the C-shaped spacer positioned therebetween.

Figure 2:
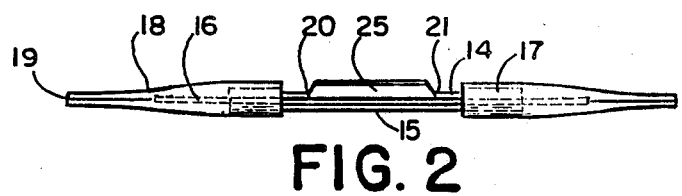
FIG. 2 is a front elevational view of the game caller.
Figure 3:
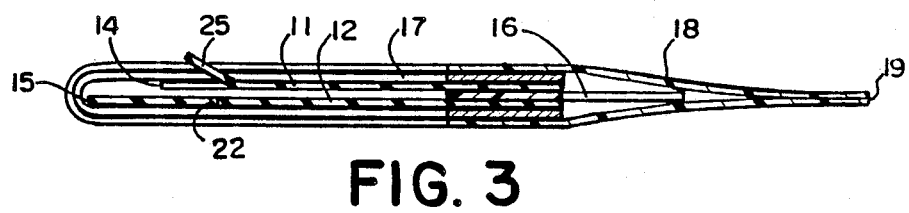
FIG. 3 is a cross-sectional view taken along the 3—3 in FIG. 1.

The diaphragms 11 and 12 are stretched to a desired tension and are fixedly retained by the bent and compressed frame 17 in the spaced-apart relationship with one diaphragm generally overlying the other diaphragm. The diaphragms are held in tension between the bent-over half portions of the frame 17. The free edges 14 and 15 of the diaphragms are confined between the bends of the frame 17, as best shown in FIG. 2, with the C-shaped spacer positioned in general alignment between the C-shaped half frame sections of the bent frame 17, as best shown in FIG. 1. The spacer 16 may be dimensioned to protrude from the side of the bent frame 17 distal to the diaphragms. As shown in FIGS. 2 and 3, frame 17 is bent to hold the diaphragms so that the bent portion of the frame covers the gap between the diaphragms at the outer ends of vibratory edges 14 and 15. The frame 17 is typically made of aluminum, plastic or other suitable material that is capable of taking a permanent set when the frame is bent in half to hold the diaphragms and the spacer together.

The fastener 18 which is used to hold the diaphragms 11 and 12, the spacer 16, and the frame 17 together in a fixed relationship is preferably a thin, generally flat sheet-like plastic casing having a generally C-shaped configuration. The casing covers and adheres to the outer top and bottom surfaces of each bent frame half portion and the top and bottom surfaces of the spacer projecting from the frame 17. The casing is preferably made of latex or adhesive tape sheets that are bonded together along the outer edge 19 of the casing, as shown in FIGS. 2 and 3.

Preferably, the first diaphragm 11 is shorter than the second diaphragm 12 in a manner such that the vibratory edge 14 of the first diaphragm 11 is generally parallel to, but offset from the vibratory edge 15 of the second diaphragm 12. Also, the generally shorter first diaphragm 11 is preferably positionable during use proximate to the roof of the user's mouth.

As shown in FIGS. 1 and 2, the first diaphragm 11 has at least two slits 20 and 21, generally perpendicular to vibratory edge 14, and preferably approximately equidistant from the center of free edge 14. Each slit originates at vibratory edge 14 to provide a central flap 25 on the first diaphragm 11. The flap 25 has reduced tension relative to the remaining portion of the diaphragm 11 so that it is free to flutter during use. As shown in FIG. 1, the second diaphragm 12 has at least one slit 22 generally parallel to vibratory edge 15. Preferably slit 22 is positioned so that when pulmonary air is exhausted through the slit 22, the air impinges on the first diaphragm 11 and particularly the flap 25 to create a desired fluttering or raspy effect. For this purpose, the slit 22 should generally be positioned beneath the flap 25. As shown in FIG. 1, the slit 22 in diaphragm 12 is generally shorter in width than the width of flap 25.

While certain preferred embodiments of the present invention have been illustrated and described, the present invention is not limited thereto but may be variously modified or embodied within the scope of the following claims.

What is claimed is:

1. A game caller of a size and shape suitable for insertion into a user's mouth for support against the roof of the mouth comprising:
   a support;
   first and second generally flat diaphragms fixidly retained by the support in a generally spaced-apart relationship with respect to one another with one of the diaphragms generally overlying the other, each diaphragm presenting an edge free of the support to vibrate by exhausted pulmonary air, the first diaphragm having at least two slits to provide a flap on the first diaphragm and the second diaphragm having at least one slit to permit exhausted pulmonary air to flow therethrough, the exhausted pulmonary air causing said flap to flutter during use.

2. The game caller as recited in claim 1 wherein the support comprises:
   a spacer positioned between the first and second diaphragms for spacing apart the first and second diaphragms;
   a frame having a centrally disposed window, said frame being bent over to form first and second frame halves, said frame holding said spacer and diaphragms between the frame halves with one diaphragm being supported between the spacer and the first frame half and the other diaphragm being supported between the spacer and the second frame half; and
   a fastener to hold the spacer, the frame, and the diaphragms together in a fixed relationship.

3. The game caller as recited in claim 2 wherein the fastener comprises a sheet-like casing.

4. The game caller as recited in claim 1 wherein each of the two slits on the first diaphragm originate at the vibratory edge of said first diaphragm.

5. The game caller as recited in claim 1 wherein the first diaphragm has a smaller exposed surface area than the second diaphragm and the vibratory edge of the first diaphragm is positioned substantially parallel to, but offset from, the vibratory edge of the second diaphragm.

6. The game caller as recited in claim 1 wherein the first diaphragm is positionable proximate to the roof of the user's mouth.

7. The game caller as recited in claim 1 wherein the slit in the second diaphragm is positioned so that that pulmonary air exhausted through said slit in the second diaphragm impinges on the first diaphragm.

8. The game caller as recited in claim 1 wherein the slit in the second diaphragm is positioned so that pulmonary air exhausted through the slit in the second diaphragm impinges on the flap of the first diaphragm.

9. The game caller as recited in claim 8 wherein the slit in the second diaphragm is positioned generally beneath the flap of the first diaphragm.

10. The game caller as recited in claim 9 wherein the width of the slit in the second diaphragm is shorter than the width of the flap on the first diaphragm.

11. The game caller as recited in claim 8 wherein the first diaphragm is positionable proximate the roof of the mouth.

12. The game caller as recited in claim 1 wherein the first and second diaphragms are held on the support under tension and said flap has reduced tension relative to the tension on a remaining portion of the first diaphragm.

13. A game caller of a size and shape suitable for insertion into a user's mouth for support against the roof of the mouth comprising:
   a frame;

first and second generally flat diaphragms fixedly retained by the frame in a generally spaced-apart relationship with respect to one another with one of the diaphragms generally overlying the other, each diaphragm presenting an edge free of the frame to vibrate by exhausted pulmonary air, said vibratory edges being oriented in a generally parallel relationship to each other, the first diaphragm having at least two slits generally perpendicular to the vibratory edge of said diaphragm to provide a flap on the first diaphragm and the second diaphragm having at least one slit generally parallel to the vibratory edge of said second diaphragm wherein the slit in the second diaphragm is positioned so that pulmonary air exhausted through the slit in the second diaphragm impinges upon the flap of the first diaphragm to cause the flap to flutter;

a spacer positioned between the first and second diaphragms for spacing apart the first and second diaphragms; and a fastener to hold the spacer, the frame, and the diaphragms together in a fixed relationship.

14. A game caller of a size and shape suitable for insertion into a user's mouth for support against the roof of the mouth comprising:

a support;

first and second generally flat, sheet-like diaphragms fixedly retained by the support in a generally spaced-apart relationship with respect to one another with one of the diaphragms generally overlying the other, each diaphragm presenting an edge free of the support to vibrate by exhausted pulmonary air, the first diaphragm being positionable proximate the roof of the mouth and having a flap and the second diaphragm having at least one slit positioned so that pulmonary air exhausted through the slit in the second diaphragm impinges upon the flap of the first diaphragm to cause the flap to flutter during use to produce a desired call.

15. The game caller as recited in claim 14 wherein each of the two slits on the first diaphragm originate at the vibratory edge of said first diaphragm.

16. The game caller as recited in claim 14 wherein the first diaphragm has a smaller exposed surface area than the second diaphragm and the vibratory edge of the first diaphragm is positioned substantially parallel to, but offset from, the vibratory edge of the second diaphragm.

17. The game caller as recited in claim 14 wherein the slit in the second diaphragm is positioned generally beneath the flap at the first diaphragm.

18. The game caller as recited in claim 14 wherein the width of the slit in the second diaphragm is shorter than the width of the flap on the first diaphragm.

19. The game caller as recited in claim 14 wherein the first and second diaphragms are held on the support under tension and said flap has reduced tension relative to the tension on a remaining portion of the first diaphragm.

20. The game caller as recited in claim 1 wherein the respective vibratory edges of the first and second diaphragms are oriented in a generally parallel relationship to each other, the slits in the first diaphragm are generally perpendicular to the vibratory edge of the first diaphragm and the slit in the second diaphragm is generally parallel to the vibratory edge of the second diaphragm.

* * * * *